US009654943B1

(12) United States Patent  
Cunico et al.

(10) Patent No.: US 9,654,943 B1  
(45) Date of Patent: May 16, 2017

(54) UNSTRUCTURED MESSAGE ESCALATION WITHIN A NETWORK COMPUTING SYSTEM

(71) Applicant: International Business Machines Corporation, Armonk, NY (US)

(72) Inventors: Hernan A. Cunico, Holly Springs, NC (US); Asima Silva, Holden, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/953,120

(22) Filed: Nov. 27, 2015

(51) Int. Cl.  
*H04W 4/14* (2009.01)  
*H04W 4/12* (2009.01)  
*H04L 12/58* (2006.01)

(52) U.S. Cl.  
CPC ............... *H04W 4/12* (2013.01); *H04L 51/34* (2013.01)

(58) Field of Classification Search  
CPC .......... H04W 4/14; H04W 4/12; H04W 4/22; H04W 88/184; H04W 88/18; H04W 76/007; H04M 3/5116; H04L 1/1621; H04L 1/1628; H04L 1/08; H04L 12/40163; H04L 12/5885; H04L 12/589; H04L 12/588  
See application file for complete search history.

(56) References Cited

U.S. PATENT DOCUMENTS

| 8,271,006 | B1 * | 9/2012 | Gilbert | H04M 3/42382 455/466 |
|---|---|---|---|---|
| 8,611,869 | B2 | 12/2013 | Jordan et al. | |
| 8,995,948 | B2 * | 3/2015 | Walker | H04W 4/02 455/404.1 |
| 2006/0031304 | A1 * | 2/2006 | Bagga | G06Q 10/107 709/206 |
| 2006/0112433 | A1 * | 5/2006 | McIsaac | H04L 51/12 726/26 |
| 2009/0253419 | A1 | 10/2009 | Phillips | |
| 2011/0084818 | A1 * | 4/2011 | Graham | H04M 1/663 340/407.1 |
| 2015/0036815 | A1 | 2/2015 | Conway et al. | |

FOREIGN PATENT DOCUMENTS

EP   1770932 A1   4/2007

* cited by examiner

*Primary Examiner* — Meless Zewdu  
(74) *Attorney, Agent, or Firm* — Cuenot, Forsythe & Kim, LLC (57) ABSTRACT

Unstructured message escalation may include, responsive to detecting an unanswered message from a sending mobile device of a sender to a receiving mobile device of a recipient, determining a sender-recipient relationship and a last known location of the receiving mobile device, determining a first contact of the recipient from a contact data storage device according to the sender-recipient relationship, a relationship between the recipient and the first contact, proximity, and an escalation plan for the recipient, and sending a first escalation message to the first contact. Responsive to determining that the message is unanswered subsequent to sending the first escalation message, selecting a second contact of the recipient according to the sender-recipient relationship, a relationship between the second contact and the recipient, proximity, and the escalation plan and sending a second escalation message to the second contact.

20 Claims, 3 Drawing Sheets

UNSTRUCTURED MESSAGE ESCALATION WITHIN A NETWORK COMPUTING SYSTEM

BACKGROUND

This disclosure relates to message escalation and, more particularly, to unstructured message escalation within a network computing system.

Message escalation refers to a process where, in response to a message sent by a sender to a recipient going unanswered, the message may be forwarded to one or more other users. Typically, the message is forwarded to other users with a known association with the recipient. The users to whom the message may be forwarded are often specified in a predetermined, or static, hierarchical structure such as a formalized organizational chart or hierarchical directory.

In other less formal communication environments, message escalation is a manual process. A sender may be trying to reach a friend or a family member. In cases where the message from the sender goes unanswered, the sender must manually contact friends or family members in an effort to locate the recipient.

SUMMARY

An embodiment of the present invention may include a method. The method may include, responsive to detecting an unanswered message from a sending mobile device of a sender to a receiving mobile device of a recipient, determining, using a processor, a relationship between the sender and the recipient and a last known location of the receiving mobile device, determining, using the processor, a first contact of the recipient from a data storage device according to the relationship between the sender and the recipient, a relationship between the recipient and the first contact, proximity of the first contact to the last known location, and an escalation plan for the recipient, and sending, using the processor, a first escalation message to the first contact. The method may also include, responsive to determining that the message is unanswered subsequent to sending the first escalation message, selecting, using the processor, a second contact of the recipient from the data storage device according to the relationship between the sender and the recipient, a relationship between the second contact and the recipient, proximity of the second contact to the last known location, and the escalation plan, and sending, using the processor, a second escalation message to the second contact.

Another embodiment of the present invention may include a system having a processor programmed to initiate executable operations. The executable operations may include, responsive to detecting an unanswered message from a sending mobile device of a sender to a receiving mobile device of a recipient, determining a relationship between the sender and the recipient and a last known location of the receiving mobile device, determining a first contact of the recipient from a data storage device according to the relationship between the sender and the recipient, a relationship between the recipient and the first contact, proximity of the first contact to the last known location, and an escalation plan for the recipient, and sending a first escalation message to the first contact. The executable operations may also include, responsive to determining that the message is unanswered subsequent to sending the first escalation message, selecting a second contact of the recipient from the data storage device according to the relationship between the sender and the recipient, a relationship between the second contact and the recipient, proximity of the second contact to the last known location, and the escalation plan, and sending a second escalation message to the second contact.

Another embodiment of the present invention may include a computer program product including a computer readable storage medium having program code stored thereon. The program code is executable by a processor to perform a method. The method may include, responsive to detecting an unanswered message from a sending mobile device of a sender to a receiving mobile device of a recipient, determining, using a processor, a relationship between the sender and the recipient and a last known location of the receiving mobile device, determining, using the processor, a first contact of the recipient from a data storage device according to the relationship between the sender and the recipient, a relationship between the recipient and the first contact, proximity of the first contact to the last known location, and an escalation plan for the recipient, and sending, using the processor, a first escalation message to the first contact. The method may also include, responsive to determining that the message is unanswered subsequent to sending the first escalation message, selecting, using the processor, a second contact of the recipient from the data storage device according to the relationship between the sender and the recipient, a relationship between the second contact and the recipient, proximity of the second contact to the last known location, and the escalation plan, and sending, using the processor, a second escalation message to the second contact.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

This disclosure relates to message escalation and, more particularly, to unstructured message escalation within a network computing system. In accordance with the inventive arrangements disclosed herein, message escalation may be performed for unanswered messages in a network computing system that lacks a formalized, or structured, message escalation hierarchy. An unanswered message from a sender to a recipient may be escalated based upon a number of different factors. These factors may include, but are not limited to, the relationship between the sender and the recipient, relationships between the recipient and contacts of the recipient to whom the message may be escalated, and/or proximity of contacts of the recipient to the recipient.

In one arrangement, the recipient may be associated with an escalation plan. The escalation plan may specify one or more rules for escalating an unanswered message to the recipient. For example, the rules of the escalation plan may specify types of contacts that may be contacted and the circumstances under which the contacts may be contacted for purposes of escalating a message. The rules may specify how factors such as relationships and proximity are interpreted for purposes of message escalation. The escalation plan allows a message to be escalated to an appropriate contact of the recipient despite the lack of a hierarchical escalation structure in place to follow. Further aspects will be described herein with reference to the drawings below.

Figure 1:
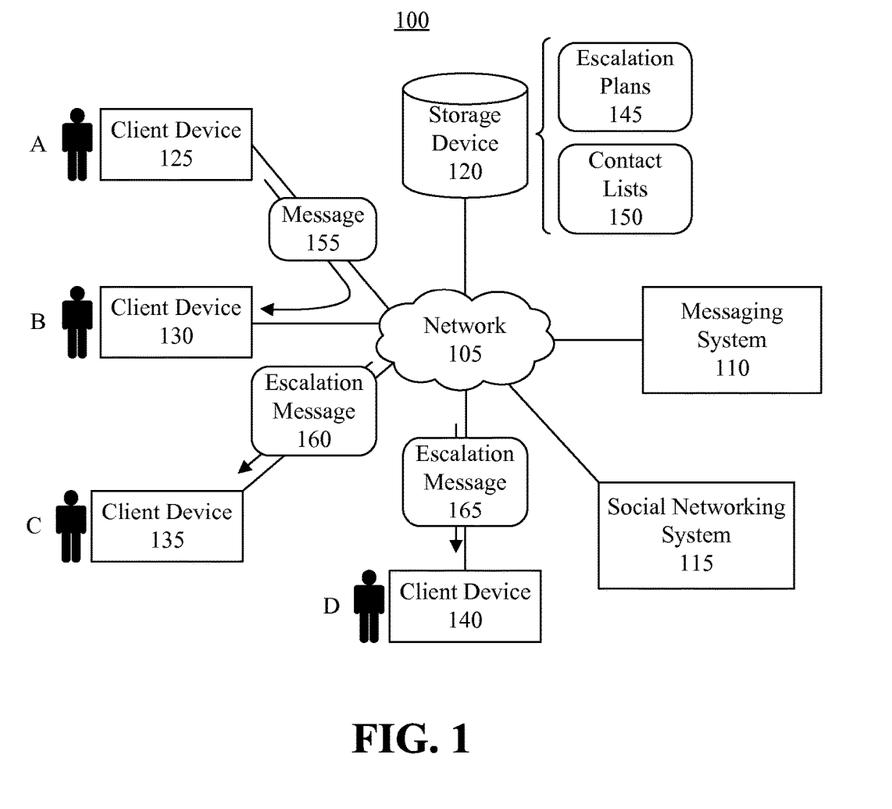
FIG. 1 is a block diagram illustrating an example of a network computing system.

FIG. 1 is a block diagram illustrating an example of a network computing system 100 in which the inventive arrangements may be implemented. Network computing system 100 contains a network 105. Network 105 is the medium used to provide communications links between various devices and data processing systems connected together within network computing system 100. Network 105 may include connections, such as wired communication links, wireless communication links, or fiber optic cables. Network 105 may be implemented as, or include, any of a variety of different communication technologies such as a Wide Area Network (WAN), a Local Area Network (LAN), a wireless network (e.g., a wireless WAN and/or a wireless LAN), a mobile or cellular network, a Virtual Private Network (VPN), the Internet, the Public Switched Telephone Network (PSTN), or the like.

In example of FIG. 1, a messaging system 110 may couple to network 105. A social networking system 115 and a data storage device 120 may also couple to network 105. In addition, client devices (clients) 125, 130, 135, and 140 may couple to network 105. Clients 125, 130, 135, and 140 may be, for example, personal computers, portable devices, network computers, tablet computers, mobile devices, e.g., mobile phones, or the like. Messaging system 110 may be implemented as one or more data processing systems, e.g., servers, executing suitable operational software to support communications among clients 125, 130, 135, and/or 140. Clients 125, 130, 135, and/or 140 may communicate with messaging system 110 in order to exchange messages among one another. Messaging system 110 may perform operations such as message handling, delivery, and message escalation as described herein.

In one arrangement, messaging system may be an instant messaging system. Within this disclosure, the term "instant messaging," or derivatives thereof, refers to instant messaging, text messaging, Short Message Service (SMS) communications, or other forms of messaging that provide real time or near real time communication. In another arrangement, messaging system may be an electronic mail system.

Social networking system 115 is a computing platform that allows users to build social networks or social relations among people who share similar interests, activities, backgrounds or real-life connections. Through social networking system 115, users may send communications such as by posting messages or other media, commenting on messages, posts, or other media, replying to messages, and performing other operations such as "liking" a communication or item of media, sharing the communication or item of media, expressing an emotional sentiment, or the like. It should be appreciated that in the context of social networking system 115, actions such as posting, replying, liking, sharing, expressing sentiment, and/or the like are programmatic actions that are monitored and persisted within social networking system 115, e.g., within a data storage device in a data structure within and/or accessible by, social networking system 115. Further, social networking system 115 may store contacts, e.g., contact lists, for users that are members of social networking system 115.

Data storage device 120 may be implemented as a network accessible data storage device. As pictured, data storage device 120 may store escalation plans 145 and contact lists 150. In one arrangement, each user of messaging system 110 may be associated with an escalation plan. As used herein, the term "escalation plan" means a set of one or more processing rules associated with a user as a recipient that specify the conditions for escalating a message and the particular contacts of the recipient to whom the message is to be escalated.

Each user of messaging system 110 further may be associated with, or have, a contact list 150 specifying contacts of the user. In one aspect, messaging system 110 may synchronize contact lists 150 from the clients of users. In another aspect, the system may query social networking system 115 for contacts of users and add the contacts to respective contact lists 150 of the users. In another aspect, the system may review a message history of a user, e.g., user A, to identify other users with which the user has corresponded. The system may add the correspondents to contact list 150 of user A.

In one arrangement, each of contact lists 150 may specify relationships between the owner of the contact list and the various contacts specified therein. In one arrangement, the category of relationship may be specified. For purposes of illustration, consider an example where user A of client 125 sends a message 155 to user B of client 130 through messaging system 110. Messaging system 110 may receive message 155 from client 125 and route or provide message 155 to client 130. Message 155 may go unanswered.

As defined within this specification, the term "unanswered" means that a response to a message has not been received. In one aspect, messaging system 110 may determine that message 155 is "unanswered" while user A does not receive a response to message 155 from user B. In another aspect, messaging system 110 may determine that message 155 is unanswered when a confirmation of delivery and/or a read receipt for message 155 is not received from client 130 of user B.

As part of ongoing operation, messaging system 110 is in communication with clients 125, 130, 135, and 140 from time-to-time, periodically, or responsive to events. Accordingly, messaging system 110 may receive and store location information for each respective client. The location information may be stored and/or updated from time-to-time, periodically, or the like. It should be appreciated that locations may be determined using any of a variety of different location determination technologies such as Global Positioning System, recognized local wireless networks that clients have joined, triangulation, or the like. The particular location determination technology used is not intended to limit the inventive arrangements disclosed herein.

In one arrangement, responsive to determining that message 155 is unanswered, messaging system 110 may retrieve escalation plan 145 of user B. Messaging system 110 may determine an amount of time to wait prior to escalating message 155 according to escalation plan 145 of user B. In one aspect, responsive to determining that message 155 is to be escalated, messaging system 110 may retrieve contact list 150 for user B. Messaging system 110 may analyze and understand the relationships between contacts specified in contact list 150. For example, messaging system 110 may determine a category of relationship between user A, the sender, and user B, the recipient. Exemplary relationship categories may include, but are not limited to, work (co-workers), customer, family (i.e., immediate family), relative (non-immediate family), friend, acquaintance, or the like. In one embodiment, the particular category of relationship may be specified explicitly within contact list 150 of user B. In this example, user C and user D may be specified as contacts within contact list 150 of user B. Accordingly, messaging system 110 also may determine the category of relationship between user B and user C and the category of relationship between user B and user D.

While contact list 150 is described as specifying relationships between contacts and the owner of the contact list, it should be appreciated that relationships may be determined and quantified using any of a variety of different techniques that are generally known in the art such as analysis of content and/or frequency of communications, analysis of communication times, how quickly a user responds, if at all, to a message from another user, etc. In this regard, the particular way in which relationships are determined is not intended to be a limitation of the inventive arrangements described herein.

In the example of FIG. 1, messaging system 110 may select user C from contact list 150 based upon one or more factors and escalation plan 145 of user B. For example, messaging system 110 may select user C according to the relationship between user A and user B, the relationship between user B and user C, proximity of user C to user B, and escalation plan 145 of user B. Accordingly, messaging system 110 may send escalation message 160 to client 135 of user C.

In one aspect, the amount of message 155 revealed or included within escalation message 160, if any at all, may be specified by escalation plan 145 of user B. In some cases, the entirety of message 155 may be included in escalation message 160. In other cases, escalation message 160 may only indicate that user A has unsuccessfully tried to contact user B and request that user C either contact user B or reply to user A.

In the event that message 155 remains unanswered after sending escalation message 160, messaging system 110 may increase the level of escalation and select a further contact, e.g., user D, from contact list 150 of user B for further escalating message 155. Messaging system 110 may select user D according to the relationship between user A and user B, the relationship between user B and user D, proximity of user D to user B, and escalation plan 145 of user B. As pictured, messaging system 110 may send escalation message 165 to client 140 of user B. The amount of message 155 revealed or included within escalation message 165, if any at all, may be specified by escalation plan 145. In one aspect, for example, the particular contacts selected, the amount of message 155 included in an escalation message, and the like may be specified by rules in escalation plan 145 and may vary according to the number of failed escalations, e.g., number of escalation messages sent by messaging system 110 without receiving a response.

In the example illustrated in FIG. 1, messaging system 110 may select the particular users to whom a message is escalated. The sender, e.g., user A in this case, need not be aware of the particular users to whom the message is escalated, the number of attempts and/or escalations, or the like.

In another example, escalation plan 145 of user B may also specify the particular conditions that must exist before messaging system 110 may access social networking system 115. In one arrangement, messaging system 110 may access contact lists of user B stored within social networking system 115. Messaging system 110 may add contacts from social networking system 115 to contact list 150 of user B, post a message to social networking system 115, e.g., to particular contacts of user B within social networking system 115 under particular conditions set forth in the rules of escalation plan 145, or the like.

FIG. 1 is provided for purposes of illustration and is not intended to limit the inventive arrangements described herein. It should be appreciated that network computing system 100 may include fewer elements than shown or more elements such as additional servers, clients, and other devices. Further, while data storage device 120 is illustrated, in another aspect, the contents of data storage device 120 may be stored within a data storage device locally within messaging system 110. Each of messaging system 110 and/or social networking system 115 may be implemented by one or more interconnected computers.

Figure 2:
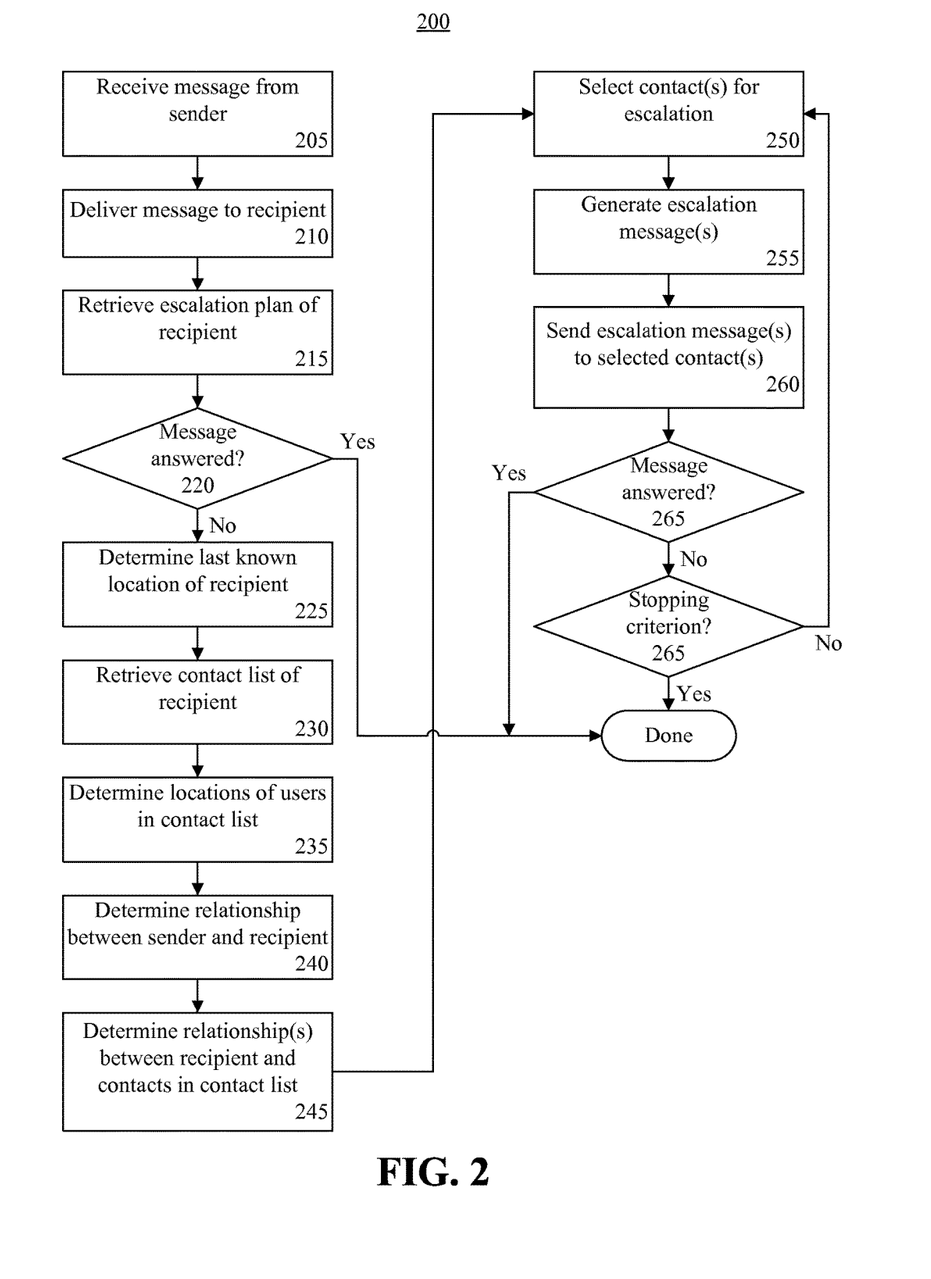
FIG. 2 is a flow chart illustrating an exemplary method of message escalation.

FIG. 2 is a flow chart illustrating an exemplary method 200 of message escalation. Method 200 may be performed by a system such as messaging system 100 of FIG. 1 (hereafter "the system" in reference to FIG. 2). In the example of FIG. 2, the clients are referred to as "mobile devices." It should be appreciated, however, that other varieties of client devices may be used and that use of the term "mobile device" is for purposes of illustration and not limitation.

In block 205, the system may receive a message from a sender, e.g., user A. The message is directed to a recipient, e.g., user B. In block 210, the system may deliver, or attempt to deliver, the message to the recipient. In block 215, the system may retrieve the escalation plan of the recipient. For ease of discussion, with reference to FIG. 2, the term "user A" may be used interchangeably with the term "sender." Similarly, the term "user B" may be used interchangeably with the term "recipient."

In block 220, the system may determine whether the message is answered. If so, method 200 may end. For example, the system may receive a confirmation from a client of the recipient that the message was delivered. In another example, the system may receive a response message from user B directed to user A. The system, for example, responsive to receiving a response message from user B directed to user A within a predetermined amount of time of user A sending the message to user B, may consider the message answered. In the case where the message is answered, the system may not perform any escalation of the message. If the system determines that the message is unanswered, method 200 may continue to block 225.

In one aspect, the system may determine whether the message is unanswered according to the escalation plan. The escalation plan, for example, may specify an amount of time to wait for a response from the recipient and/or a delivery confirmation before determining that the message is unanswered. If the recipient sends a response message to the sender within a predetermined amount of time, e.g., an amount of time specified by the escalation plan, the system may determine that the message has been answered.

Continuing in the case where the message is unanswered, in block 225, the system may determine the last known location of the recipient. More particularly, the system may determine the last known location of the mobile device of the recipient.

In block 230, the system may retrieve a contact list for the recipient. In one aspect, the system may synchronize the contact list from the recipient's mobile device. In another aspect, the system may query a social networking system for contacts of the recipient. In another aspect, the system may review a message history of the recipient, whether internal or obtained from the social networking system, to identify other users with whom the recipient has corresponded. The system may add the correspondents to the contact list of the recipient.

In block 235, the system determine the location of contacts, i.e., users, in the contact list of the recipient. The locations of the contacts in the contact list may be updated from time-to-time, periodically, or responsive to a request from the system to the various mobile devices of the contacts.

In block 240, the system may determine the relationship between the sender and the recipient. In one aspect, the system may determine a category of the relationship. As discussed, exemplary types of relationships may include, but are not limited to, work (co-workers), customer, family, friend, acquaintance, etc. In general, the category of relationship may indicate the relative closeness of the two users being considered. Still, in another aspect, the system may determine a level of closeness within a particular category. For example, a friend category of relationship may be categorized as degree 1 indicating a close friend or degree 2 indicating a friend that is not as close as degree 1. Family relationships may be further specified as sibling, parent-child, or the like.

In block 245, the system may determine relationships between the recipient and contacts in the contact list. The system may determine relationship categories between the recipient and one or more or all of the contacts in the recipient's contact list. In one aspect, the system may filter the contacts of the contact list prior to determining relationships and determine relationships only for those contacts remaining post filtering. For example, the system may filter the contacts according to proximity of the contacts to the recipient. The system may exclude contacts, or limit the set of contacts considered for purposes of message escalation, to those that are proximate to the recipient. As noted, in one example, proximity may be specified within the escalation plan of the recipient. The escalation plan may define proximity as a predetermined distance from the last known location of the recipient. The escalation plan may define proximity to be within a same geo-political region, e.g., same city, town, or county, as the last known location of the recipient.

In block 250, the system may select contact(s) for escalation from the contact list. In one aspect, the system may select one or more contacts according to proximity, relationships, and the escalation plan. The rules of the escalation plan may specify conditions for selecting and communicating with contacts through one or more levels of escalation for the message. The rules may specify conditions such as the proximity that must exist between a contact and the last known location of the recipient for the contact to be considered for escalation, the category of relationship that must exist between the contact and the recipient given the relationship between the sender and the recipient to be considered for escalation, a number of contacts to be contacted for a given level of escalation, the communication channel for communication with a contact, and the like.

The escalation plan may also include rules that specify the conditions for moving from one level of escalation to the next. The rules utilized for each respective level of escalation may be different and/or specific to each respective level of escalation.

As an illustrative example, the escalation plan may include rules for a first level of escalation specifying that a contact must be within 5 miles of the recipient and have a same category of relationship as the sender and recipient to be considered for escalation. The sender and recipient may be family members. In that case, the system may determine a contact from the contact list of the recipient that is within 5 miles of the recipient's last known location and that is a family member of the recipient.

In block 255, the system may generate escalation messages. In one aspect, the system may generate an escalation message for each of the contact(s) selected in block 250. In one arrangement, the system may determine the amount of information to be disclosed in each of the escalation messages generated from rules of the escalation plan. The system, for example, may determine how much of the original message, if any, is to be included in each escalation message according to rules of the escalation plan. The rules may indicate that the entire message should be included or only a portion such as the sender identity, recipient identity, and/or time the original message from user A to user B was sent.

In block 260, the system may send the escalation message(s) to the selected contact(s). In block 265, the system may determine whether the message has been answered. If so, method 200 may end. If not, method 200 may continue to block 270. In one aspect, the system may consider the original message from user A to user B unanswered until the system detects a response sent from user B to user A. In another aspect, the system may determine that the message is unanswered until the system detects a message sent from a selected escalation contact to the recipient, i.e., user B.

For example, the system may determine that the original message is answered responsive to detecting a message from an escalation contact to the recipient within a predetermined amount of time of the escalation contact receiving the escalation message. In another aspect, the system may determine that the original message is answered responsive to detecting a message exchange between an escalation contact and the recipient, e.g., a message from the escalation contact to the recipient within a predetermined amount of time of the escalation message and a response from the recipient to the escalation contact.

In any case, the system may record the number of escalated contacts that were sent escalation messages, how many times a message is escalated to a different level of escalation (e.g., with additional processing rules determining the escalation messages to be sent), and the like. For example, as the system sends escalation messages and iterates, the system may store information such as "escalated 1 time to 5 contacts" or "escalated 2 times to two contacts."

In block 270, the system may determine whether a stopping criterion has been met. If so, method 200 may end. If not, method 200 may back to block 250 to continue processing. In one arrangement, the escalation plan may specify the stopping criterion. The stopping criterion may be defined as one or more rules defining conditions that must be met for the system to discontinue the escalation process. The rules may specify that after a particular number of failed attempts to contact an escalation contact, after contacting a particular number of escalation contacts, or after increasing through a particular number of escalations the system is to discontinue the escalation process.

Method 200 may iterate as described. In one arrangement, the system may count the number of failed attempts to contact escalation contacts. As the count of failed attempts increases, for example, the system may increment the level of escalation thereby causing the system to follow and/or implement rules of the escalation plan for the incremented level of escalation. In one arrangement, each time method 200 loops back to block 250, the system may increment to a next higher level of escalation, where, per the rules, further escalation contact(s) are selected and sent escalation message(s).

As an illustrative example, the system may initially attempt to send an escalation message to a family member of the recipient since the sender and recipient have a family relationship. As the system progresses to a different level of escalation, the system may send an escalation message to an escalation contact that is a work contact, e.g., a contact with a different category of relationship, with the recipient. In still another example, as the level of escalation reaches a particular threshold, the system may post an escalation message to a social networking system. Rules of the escalation plan may determine how the escalation process proceeds. For example, after a certain number of failed attempts to reach an escalation contact and/or at a particular level of escalation, the system may expand the escalation from "Family" and "Friend" contact categories to "Work". In other cases, the system may decide to escalate to contacts determined from a social networking system that may be associated with the recipient through communication history, or the like.

In another illustrative example, the client of user B may be turned off. For example, user B's client may have run out of battery and shut down. User B may be out for the evening with friends that may also have clients, e.g., mobile phones in this example. Further, user B may be unaware that user B's client is turned off. User A may be a parent of user B and may be trying to send a text message to user B. In this case, the parent will not receive a response from user B and will not receive a confirmation that the text message was either delivered or read by user B.

In this example, the system may determine contacts of user B that are friends, per the escalation plan associated with user B. The system may filter the contacts of user B according to proximity of the contacts to the last known location of the client of user B, e.g., just prior to the client turning off. The system may forward the message sent from the parent of user B to one or more contacts of user B that are considered friends and that are within the defined proximity of the last known location of the client of user B.

While the system may forward the entire message sent by user A, in another aspect, the system may forward a portion of the message in accordance with rules of the escalation plan for user B. The system may send a notification as the escalation message that only indicates that user A is trying to reach user B. The escalation message may also specify the time that the message from user A to user B was sent.

Accordingly, user B's friends may let user B know of the attempted contact by user A. User B may contact user A using a friend's client. Alternatively, a friend may contact user A. The operations performed by the system may be performed automatically. Without performing the described actions, user A would need to start calling all of user B's friends and ask whether user B is with those friends.

In the event the system determines that the message from user A to user B remains unanswered after the first level of escalation, the system may select one or more further escalation contacts and continue. As noted, the system may begin selecting contacts with different relationships to user B and/or resort to accessing and/or posting to a social networking system in accordance with the particular set of rules for the level of escalation.

In another arrangement, the system may apply rules in a recursive manner to a particular user located as the escalation contact. Continuing with the prior example, the system may identify an escalation contact, i.e., user C, from the contact list of user B. If the escalation is unsuccessful, e.g., the message to user B is still unanswered, the system may apply the rules for the current level of escalation to the contact list of user C. As such, the system may access the contact list of user C, and select one or more escalation contacts, e.g., user D, from the contact list of user C that match the rules specified for the current level of escalation. User D, in this example, may not be in the contact list of user B. The system, however, may determine that user D matches the rules in effect for the current level of escalation. The rules, for example, may indicate that "contact of contact" escalation is permitted and/or the conditions necessary to permit such escalation. It should be appreciated that the system may utilize the contacts of user C while also escalating to one or more different contacts from the contact list of user B. The system may continue to iterate by expanding to "contacts of contacts" until a stopping criterion is met or the message is answered.

Figure 3:
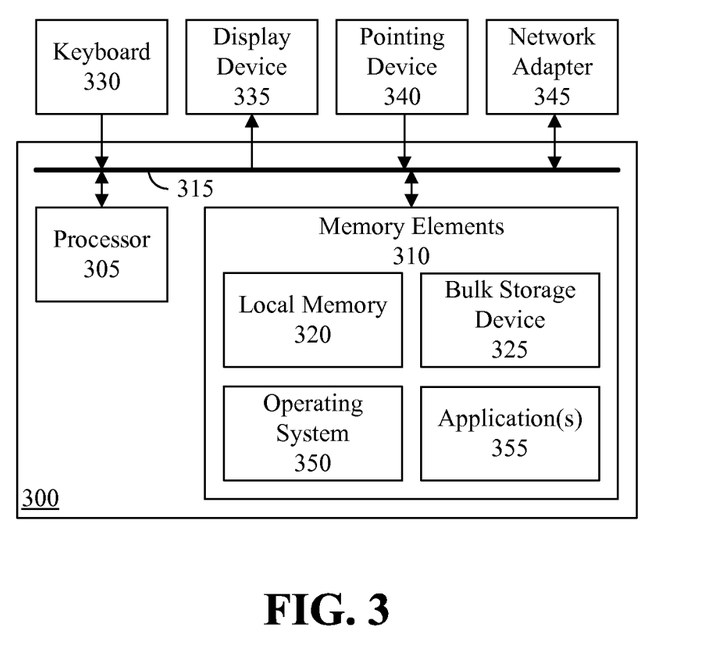
FIG. 3 is a block diagram illustrating exemplary architecture for a data processing system.

FIG. 3 is a block diagram illustrating an exemplary architecture 300 for a data processing system. Architecture 300 may be used to implement a computer that is suitable for storing and/or executing program code. In one aspect, for example, architecture 300 may be used to implement messaging system 110 of FIG. 1.

Architecture 300 includes at least one processor 305, e.g., a central processing unit (CPU), coupled to memory elements 310 through a system bus 315 or other suitable circuitry. Architecture 300 stores program code within memory elements 310. Processor 305 executes the program code accessed from memory elements 310 via system bus 315. In one aspect, architecture 300 may be used to implement a computer, e.g., a server, or other data processing system that is suitable for storing and/or executing program code. It should be appreciated, however, that architecture 300 may be used to implement any system including a processor and memory that is capable of performing the functions described within this disclosure.

Memory elements 310 include one or more physical memory devices such as, for example, a local memory 320 and one or more bulk storage devices 325. Local memory 320 may be implemented as a random access memory (RAM) or other non-persistent memory device(s) generally used during actual execution of the program code. Bulk storage device 335 may be implemented as a hard disk drive (HDD), solid state drive (SSD), or other persistent data storage device. Architecture 300 also may include one or more cache memories (not shown) that provide temporary storage of at least some program code in order to reduce the number of times program code must be retrieved from the bulk storage device during execution.

Input/output (I/O) devices such as a keyboard 330, a display device 335, and a pointing device 340 optionally may be coupled to architecture 300. The I/O devices may be coupled to architecture 300 either directly or through intervening I/O controllers. A network adapter 345 may also be coupled to architecture 300 to enable a system implemented using architecture 300 to become coupled to other systems, computer systems, remote printers, and/or remote storage devices through intervening private or public networks. Modems, cable modems, Ethernet cards, and wireless transceivers are examples of different types of network adapter 345 that may be used with architecture 300.

Memory elements 310 store an operating system 350 and an application 355. Operating system and application 355, being implemented in the form of executable program code, are executed by architecture 300. As such, operating system 350 and/or application 355 may be considered an integrated part of any system implemented using architecture 300. Application 355 and any data items used, generated, and/or operated upon by architecture 300 while executing application 355 are functional data structures that impart functionality when employed as part of architecture 300.

In the case where architecture 300 is used to implement the messaging system of FIG. 1, operating system 350 may be a server-side operating system; and, application 355 may be one or more server-side applications that, when executed, cause the system to perform the various operations described herein. It should be appreciated that messaging system 110 may implemented as a computer having an architecture as described with reference to FIG. 3 or a plurality of interconnected computers having architectures as described with reference to FIG. 3. Further, the architecture may have fewer or more elements than shown. The architecture illustrated in FIG. 3 is provided for purposes of illustration only and, as such, is not intended to limit the inventive arrangements described herein.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the term "another" means at least a second or more.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "plurality" means two or more than two.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the terms "program code," "software," "application," and "executable code" mean any expression, in any language, code or notation, of a set of instructions intended to cause a data processing system to perform a particular function either directly or after either or both of the following: a) conversion to another language, code, or notation; b) reproduction in a different material form. Examples of program code may include, but are not limited to, a subroutine, a function, a procedure, an object method, an object implementation, an executable application, an applet, a servlet, source code, object code, a shared library/dynamic load library and/or other sequence of instructions designed for execution on a computer system.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
responsive to detecting an unanswered message from a sending mobile device of a sender to a receiving mobile device of a recipient:
determining, using a processor, a relationship between the sender and the recipient and a last known location of the receiving mobile device;
determining, using the processor, a first contact of the recipient from a data storage device according to the relationship between the sender and the recipient, a relationship between the recipient and the first contact, proximity of the first contact to the last known location, and an escalation plan for the recipient; and
sending, using the processor, a first escalation message to the first contact;
responsive to determining that the message is unanswered subsequent to sending the first escalation message:
selecting, using the processor, a second contact of the recipient from the data storage device according to the relationship between the sender and the recipient, a relationship between the second contact and the recipient, proximity of the second contact to the last known location, and the escalation plan; and
sending, using the processor, a second escalation message to the second contact.

2. The method of claim 1, wherein the escalation plan specifies rules for contacting contacts of the recipient according to number of escalation messages and category of relationship.

3. The method of claim 1, wherein the escalation plan specifies rules for posting an escalation message to a social networking system.

4. The method of claim 1, wherein the escalation plan specifies rules for sending an escalation message to a contact of the recipient having a relationship with the recipient of a different category than the relationship between the sender and the recipient.

5. The method of claim 1, wherein the escalation plan specifies rules dictating an amount of the message to expose within the first and second escalation messages.

6. The method of claim 1, wherein the rules specify proximity conditions for the first contact and the second contact according to a message escalation level.

7. The method of claim 1, wherein at least one of the first contact or the second contact is determined from a social networking system used by the recipient.

8. A system, comprising:
a processor programmed to initiate executable operations comprising:
responsive to detecting an unanswered message from a sending mobile device of a sender to a receiving mobile device of a recipient:
determining a relationship between the sender and the recipient and a last known location of the receiving mobile device;
determining a first contact of the recipient from a data storage device according to the relationship between the sender and the recipient, a relationship between the recipient and the first contact, proximity of the first contact to the last known location, and an escalation plan for the recipient; and
sending a first escalation message to the first contact;
responsive to determining that the message is unanswered subsequent to sending the first escalation message:
selecting a second contact of the recipient from the data storage device according to the relationship between the sender and the recipient, a relationship between the second contact and the recipient, proximity of the second contact to the last known location, and the escalation plan; and
sending a second escalation message to the second contact.

9. The system of claim 8, wherein the escalation plan specifies rules for contacting contacts of the recipient according to number of escalation messages and category of relationship.

10. The system of claim 8, wherein the escalation plan specifies rules for posting an escalation message to a social networking system.

11. The system of claim 8, wherein the escalation plan specifies rules for sending an escalation message to a contact of the recipient having a relationship with the recipient of a different category than the relationship between the sender and the recipient.

12. The system of claim 8, wherein the escalation plan specifies rules dictating an amount of the message to expose within the first and second escalation messages.

13. The system of claim 8, wherein the rules specify proximity conditions for the first contact and the second contact according to a message escalation level.

14. The system of claim 8, wherein at least one of the first contact or the second contact is determined from a social networking system used by the recipient.

15. A computer program product comprising a computer readable storage medium having program code stored thereon, the program code executable by a processor to perform a method comprising:
responsive to detecting an unanswered message from a sending mobile device of a sender to a receiving mobile device of a recipient:
determining, using the processor, a relationship between the sender and the recipient and a last known location of the receiving mobile device;
determining, using the processor, a first contact of the recipient from a data storage device according to the relationship between the sender and the recipient, a relationship between the recipient and the first contact, proximity of the first contact to the last known location, and an escalation plan for the recipient; and
sending, using the processor, a first escalation message to the first contact;
responsive to determining that the message is unanswered subsequent to sending the first escalation message:
selecting, using the processor, a second contact of the recipient from the data storage device according to the relationship between the sender and the recipient, a relationship between the second contact and the recipient, proximity of the second contact to the last known location, and the escalation plan; and
sending, using the processor, a second escalation message to the second contact.

16. The computer program product of claim 15, wherein the escalation plan specifies rules for contacting contacts of the recipient according to number of escalation messages and category of relationship.

17. The computer program product of claim 15, wherein the escalation plan specifies rules for posting an escalation message to a social networking system.

18. The computer program product of claim 15, wherein the escalation plan specifies rules for sending an escalation message to a contact of the recipient having a relationship with the recipient of a different category than the relationship between the sender and the recipient.

19. The computer program product of claim 15, wherein the escalation plan specifies rules dictating an amount of the message to expose within the first and second escalation messages.

20. The computer program product of claim 15, wherein the rules specify proximity conditions for the first contact and the second contact according to a message escalation level.

* * * * *